United States Patent
Nylander et al.

(10) Patent No.: US 9,526,034 B2
(45) Date of Patent: Dec. 20, 2016

(54) METHOD AN APPARATUS FOR LOGGING INFORMATION

(71) Applicant: Telefonaktiebolaget L M Ericsson (publ), Stockholm (SE)

(72) Inventors: Tomas Nylander, Varmdo (SE); Per-Daniel Stalnacke, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/441,031

(22) PCT Filed: Dec. 7, 2012

(86) PCT No.: PCT/EP2012/074869
§ 371 (c)(1),
(2) Date: May 6, 2015

(87) PCT Pub. No.: WO2014/086436
PCT Pub. Date: Jun. 12, 2014

(65) Prior Publication Data
US 2015/0304893 A1 Oct. 22, 2015

(51) Int. Cl.
*H04W 36/00* (2009.01)
*H04W 24/08* (2009.01)
(Continued)

(52) U.S. Cl.
CPC ......... *H04W 36/0005* (2013.01); *H04W 24/04* (2013.01); *H04W 24/08* (2013.01);
(Continued)

(58) Field of Classification Search
CPC .. H04W 36/0005; H04W 24/04; H04W 24/08; H04W 36/08; H04W 36/14
See application file for complete search history.

(56) References Cited

U.S. PATENT DOCUMENTS

2004/0266430 A1* 12/2004 Fudim ................ H04W 48/16
455/434
2007/0223516 A1* 9/2007 Dunn ................. H04W 48/18
370/462
(Continued)

OTHER PUBLICATIONS

International Search Report issued in corresponding International application No. PCT/EP2012/074869, date of mailing of the report Sep. 27, 2013.
Written Opinion of the International Searching Authority issued in corresponding PCT/EP2012/074869, date of mailing of the opinion Sep. 27, 2013.
(Continued)

*Primary Examiner* — Chi H Pham
*Assistant Examiner* — Weibin Huang
(74) *Attorney, Agent, or Firm* — Patent Portfolio Builders PLLC

(57) ABSTRACT

The present invention provides a device and a method for logging information. The device implementing the invention is operable to attach to a first node and a second node, at least one of the first node and the second node operates within a WLAN and the other of the first node and the second node operates within a WLAN or a 3rd Generation Partnership Project, 3GPP, network. The device includes a memory and a processor. The memory includes a log, the log configured to receive at least one entry comprising an identifier for the first node and a time stamp indicating the time that the device attached to the first node. The processor acts to cause an entry to be added to the log to indicate whether an attempt by the device to attach to a second node has been successful or unsuccessful.

9 Claims, 5 Drawing Sheets

(51) Int. Cl.
*H04W 36/08* (2009.01)
*H04W 24/04* (2009.01)
*H04W 36/14* (2009.01)
*H04W 24/02* (2009.01)
*H04W 48/16* (2009.01)
*H04W 48/18* (2009.01)
*H04W 84/04* (2009.01)
*H04W 84/12* (2009.01)

(52) U.S. Cl.
CPC ........... *H04W 36/08* (2013.01); *H04W 36/14* (2013.01); *H04W 24/02* (2013.01); *H04W 48/16* (2013.01); *H04W 48/18* (2013.01); *H04W 84/042* (2013.01); *H04W 84/12* (2013.01)

(56) References Cited

U.S. PATENT DOCUMENTS

| | | | |
|---|---|---|---|
| 2010/0173626 A1* | 7/2010 | Catovic | H04W 76/027 455/423 |
| 2013/0273857 A1* | 10/2013 | Zhang | H04B 15/00 455/73 |
| 2014/0376511 A1* | 12/2014 | Kalapatapu | H04L 65/1016 370/331 |

OTHER PUBLICATIONS

NEC: "Ping pong detection in idle mode," 3GPP Draft; R3-080385, 3rd Generation Partnership Project (3GPP), Mobile Competence Centre, 650, Route des Lucioles; F-06921 Sophia-Antipolis Cedex; France, vol. Ran WG3, Sorrento, Italy, Feb. 11-15, 2008, XP050163590.

* cited by examiner

METHOD AN APPARATUS FOR LOGGING INFORMATION

TECHNICAL FIELD

The present invention relates to a method of logging information when a device moves between nodes in one or more networks. It is of particular use, although not necessarily, when a device moves between a 3rd Generation Partnership Project, 3GPP, network and a wireless local area network, WLAN.

BACKGROUND

Data traffic in mobile telecommunications networks is continually increasing. Consequently, operators are employing heterogeneous access networks that utilise multiple radio access technologies (RATs) in order to provide greater capacity, particularly in high traffic areas and areas that otherwise have poor network coverage.

Typically, the radio access technologies utilised as part of these heterogeneous access networks include UMTS Radio Access Network (UTRAN) and an Evolved UTRAN (E-UTRAN), and Wi-Fi/WLAN. For example, FIG. 1 illustrates schematically a simplified example of a heterogeneous network 1 that comprises a 3rd Generation Partnership Project (3GPP) radio access node (RAN) 2 and a Wi-Fi RAN 3 suitable for implementing the methods described herein. The 3GPP RAN 2 includes a number of 3GPP radio nodes 4. For example, if the 3GPP RAN was a UTRAN, then these radio nodes would be NodeBs and Radio Network Controllers (RNC). By way of further example, if the 3GPP RAN was an E-UTRAN, then these radio nodes would be eNodeBs. The 3GPP RAN 2 is connected to a mobile core network 5. The Wi-Fi RAN 3 includes a number of Wi-Fi/WLAN APs 7 that can be connected to a Wi-Fi/WLAN Access Controller (AC) 8. The Wi-Fi/WLAN AC 8 can control each of the Wi-Fi/WLAN APs 7 and assists in authentication of a mobile station/user terminal that wants to associate with/attach to the Wi-Fi RAN/WLAN 3.

If the heterogeneous access network comprises a UTRAN, an E-UTRAN, and a Wi-Fi RAN/WLAN then both the UTRAN and E-UTRAN standards are defined by the 3rd Generation Partnership Project (3GPP). Within 3GPP in order to enable the coverage and/or performance of a network to be monitored a UE may support Minimization of Drive Testing (MDT). A UE implementing MDT logs radio measurements relating to the network. The log may also include the location of the UE when the measurement was made. These logs are provided to one or more nodes within the network upon request and can be used in order to tune the parameters of the network or to address a problem within a network.

MDT measurements may be made when the UE is connected to a 3GPP cell and be reported directly back to the eNodeB or Radio Network Controller (RNC) dependent upon the configuration in the UE. Alternatively the MDT measurements may be logged whilst the UE is in Idle mode and not actively connected to the network. In this instance the UE will log the information and the information will be transmitted to the eNodeB or RNC when the UE next connects to the 3GPP network.

However, there is no such provision within the Wi-Fi RAN/WLAN standards defined by the Institute of Electrical and Electronics Engineers (IEEE). Thus a WiFi/WLAN RAN has no access to information about the network.

SUMMARY

According to an aspect of the present invention there is provided a device operable to attach to a first node and a second node, at least one of the first node and the second node operates within a WLAN and the other of the first node and the second node operates within a WLAN or a $3^{rd}$ Generation Partnership Project, 3GPP, network. The device includes a memory and a processor. The memory includes a log, the log configured to receive at least one entry comprising an identifier for the first node and a timestamp indicating the time that the device attached to the first node. The processor acts to cause an entry to be added to the log to indicate whether an attempt by the device to attach to a second node has been successful. A UE containing such a log can provide a node in the 3GPP network or a WLAN with a copy of all or part of the log. The information stored within the log provides the node with information about that network or another network to which the UE can connect. This allows a WiFi network or a heterogenous access network comprising both 3GPP and WiFi networks to be tuned and optimized. In particular the information contained within a log may be used to manually identify or solve a problem within one or more networks or tune one or more networks. Alternatively, the log information may be provided to a function or application to enable a Self Organizing Network feature or application to tune the parameters of the network and thereby optimize network performance.

If the device successfully attaches to the second node then the processor updates the log to include the duration the device was attached to the first node and performance information relating to at least a part of the WLAN or 3GPP network the first node operates in. This enables a node to be provided not only with information relating to the network within which it operates but with information relating to other networks which it may have an overlapping coverage. Having this information means that a network's parameters may be optimized with reference to one or more networks which have overlapping coverage.

If the device is unsuccessful attaching to the second node then the processor updates the log to indicate the failure and the reason that the attachment to the second node failed. This may be of use in the event of a problem within a network to aid the source of the problem to be identified or, alternatively, to determine whether the network requires further resources.

The processor may update the log with performance information relating to at least part of the WLAN or 3GPP network the first node operates in whilst the device is attached to the first node or the second node. This allows any node in a network, upon receipt of the log to be provided with information relating to the performance of a network thereby enabling further tuning of its parameters.

The first node and second node may operate within the same WLAN.

The processor may update the log with a new entry when the device attempts to connect to the second node.

According to another aspect of the present invention there is provided a method of operating a device. The device is able to attach to a first node and a second node where at least one of the first node and the second node operates within a WLAN and the other of the first node and the second node operates within a WLAN or a $3^{rd}$ Generation Partnership Project, 3GPP, network. The device includes a memory including a log, the log configured to receive at least one entry comprising an identifier for the first node and a timestamp indicating the time that the device attached to the first node. In the method an entry in the log is made when an attempt by the device to attach to a second node has been successful or unsuccessful.

If the device successfully attaches to the second node then the entry in the log includes information relating to the duration the device was attached to the first node and performance information relating to at least a part of the WLAN or 3GPP network the first node operates in.

If the device is unsuccessful attaching to the second node then the entry in the log includes information relating to the failure and the reason that the attachment to the second node failed.

The performance information entered into the log may relate to at least part of the WLAN or 3GPP network the first node operates in whilst the device is attached to the first node.

The first node and second node may operate within the same WLAN.

BRIEF DESCRIPTION OF THE DRAWINGS

Some embodiments of the present invention will now be described in detail with reference to the accompanying drawings, in which.

DETAILED DESCRIPTION

There will now be described a method enabling user equipment (UE) to collect information when moving between a 3GPP network or a WLAN.

Figure 1:
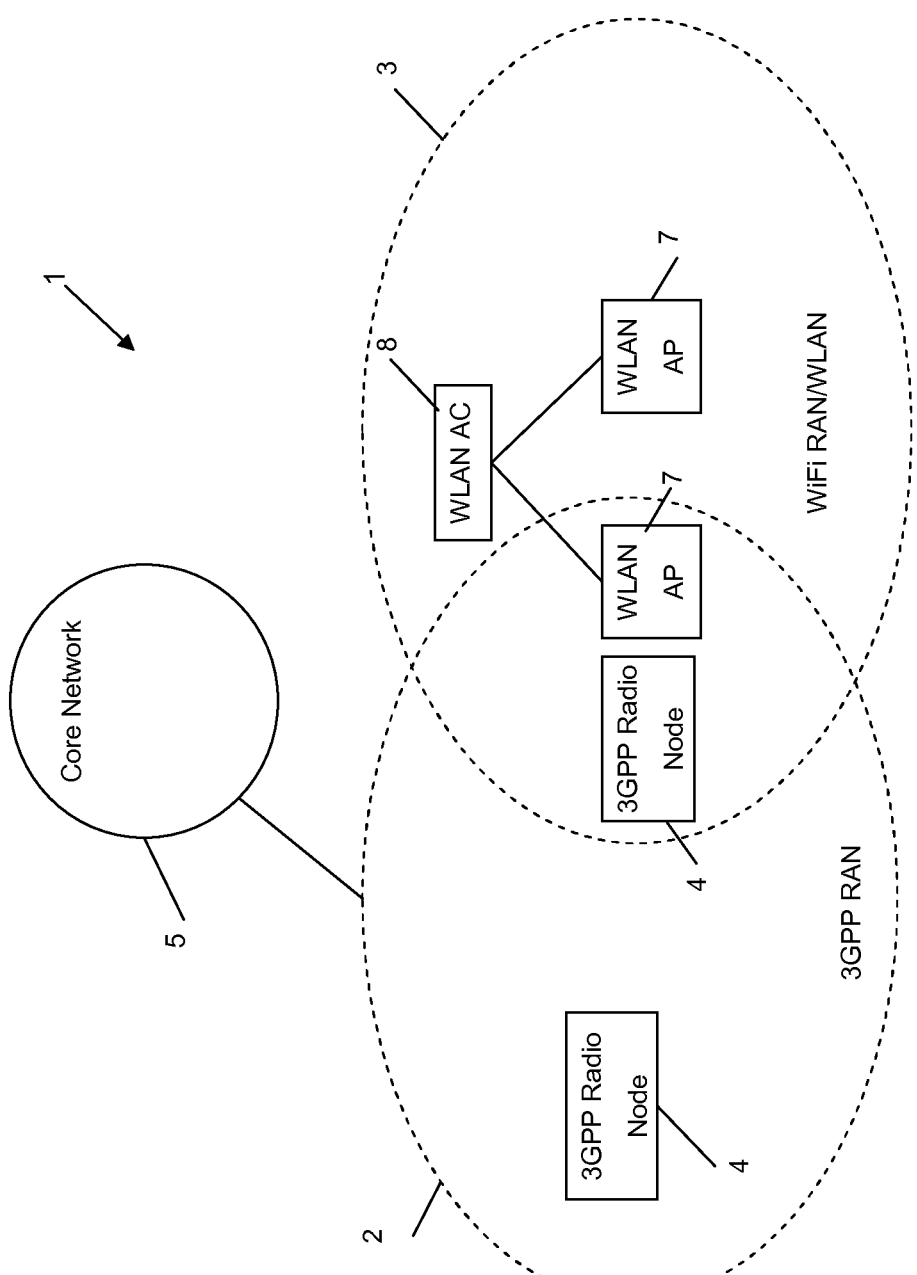
FIG. 1 illustrates schematically an example of a heterogeneous access network.

A 3GPP network, such as that illustrated in FIG. 1, may be any radio access network where the standards are defined by the 3rd Generation Partnership Project (3GPP). For example, the 3GPP network may be a Universal Mobile Telecommunications System (UMTS) or a Long Term Evolution (LTE) System.

A WLAN network may be a Wi-Fi network, such as that illustrated in FIG. 1, is a radio access network with standards defined by the Institute of Electrical and Electronics Engineers (IEEE).

The method involves user equipment recording load information relating to a network having a RAN when the user equipment is attached to that network.

A first embodiment of the invention will now be described with reference to FIG. 2. In this embodiment the UE is connected to, and has an active session with, a node in a 3GPP network and attempts to associate with a Wi-Fi network.

Figure 2:
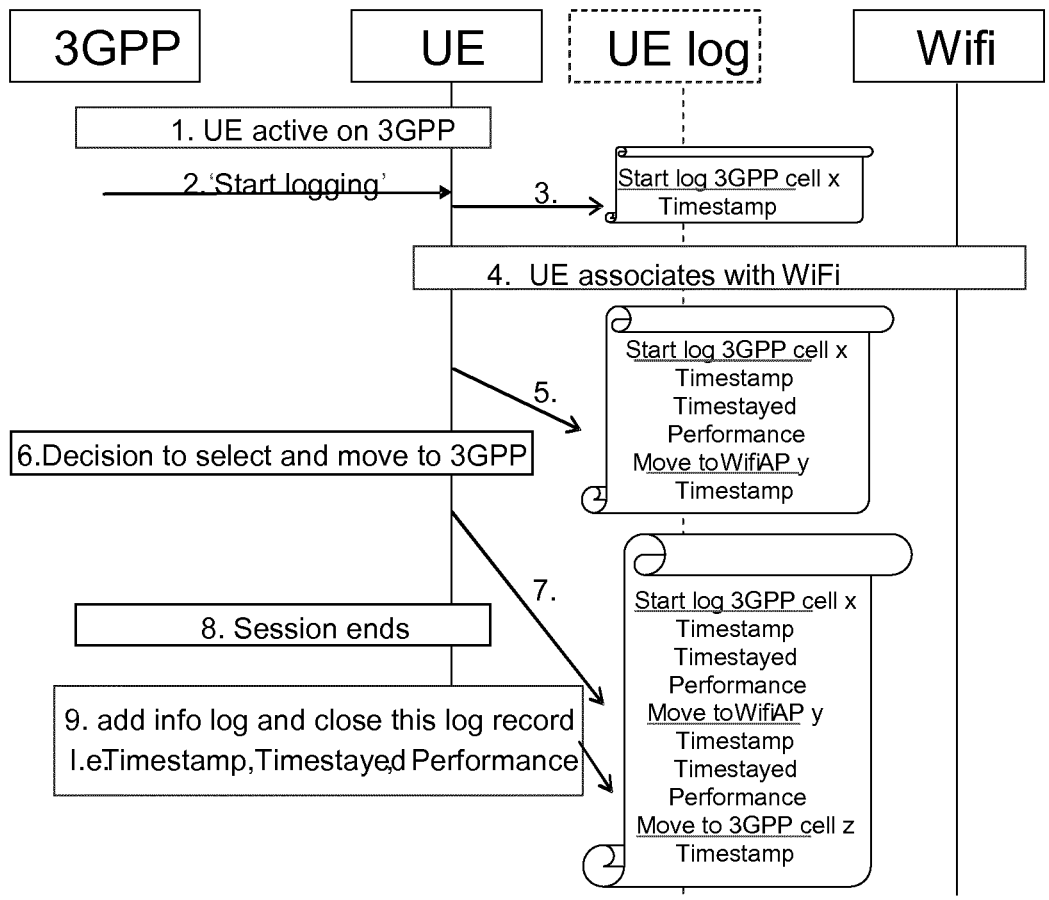
FIG. 2 is a flow diagram illustrating an example of the procedure performed by user equipment (UE) in accordance with the methods described herein.

FIG. 2 illustrates an example flow diagram of an implementation of the methods described herein. The steps performed are as follows:

1. A UE is active in a cell of a 3GPP network.
2. The 3GPP network transmits a message to the UE to cause it to start recording or logging information regarding the session with the 3GPP cell.
3. The UE creates a log identifying the 3GPP cell and also the time stamp of when the log was created.
4. The UE detects a Wi-Fi AP and transmits a request to associate with the WiFi AP and the request to associate with the WiFi AP is accepted.
5. The UE includes a new entry in the log including information about the association with the WiFi AP. The information may include, for example, an identifier for the WiFi, an identifier for the WiFi AP, a timestamp indicating when the association was made, an event identifier indicating that the event is association with a WiFi AP. The UE may also enter into the log performance information relating to the 3GPP cell it is attached to.
6. The UE may, after a period associated with the WiFi AP attempt to reattach to a 3GPP network and request to attach to a second 3GPP cell.
7. If the attachment to the 3GPP cell is allowed then the UE will include a new record in the log. The details may include, for example, the timestamp of when the request was made, an identifier indicating that the event is a request to attach with a 3GPP cell. The UE may also enter into the log performance information relating to the WiFi AP it was attached to. If the request is successful and the UE becomes attached to the 3GPP cell then the log may also be amended to include a time when the UE was no longer attached to the WiFi AP and a timestamp and identifier for the 3GPP cell that it has become attached to.
8. The UE determines to terminate the session.
9. The UE updates the log to indicate that the session has ended and may further include information relating to the time the session was terminated, the performance of the final cell or AP to which the UE was attached or associated and the total duration of the session.

Optionally, the UE may also include an entry in the log when the UE transmits a request to associate with a WiFi AP. The log entry may include, for example, the timestamp of when the association was made, an identifier indicating that the event is association with a WiFi AP and the identity of the WiFi AP.

Figure 3:
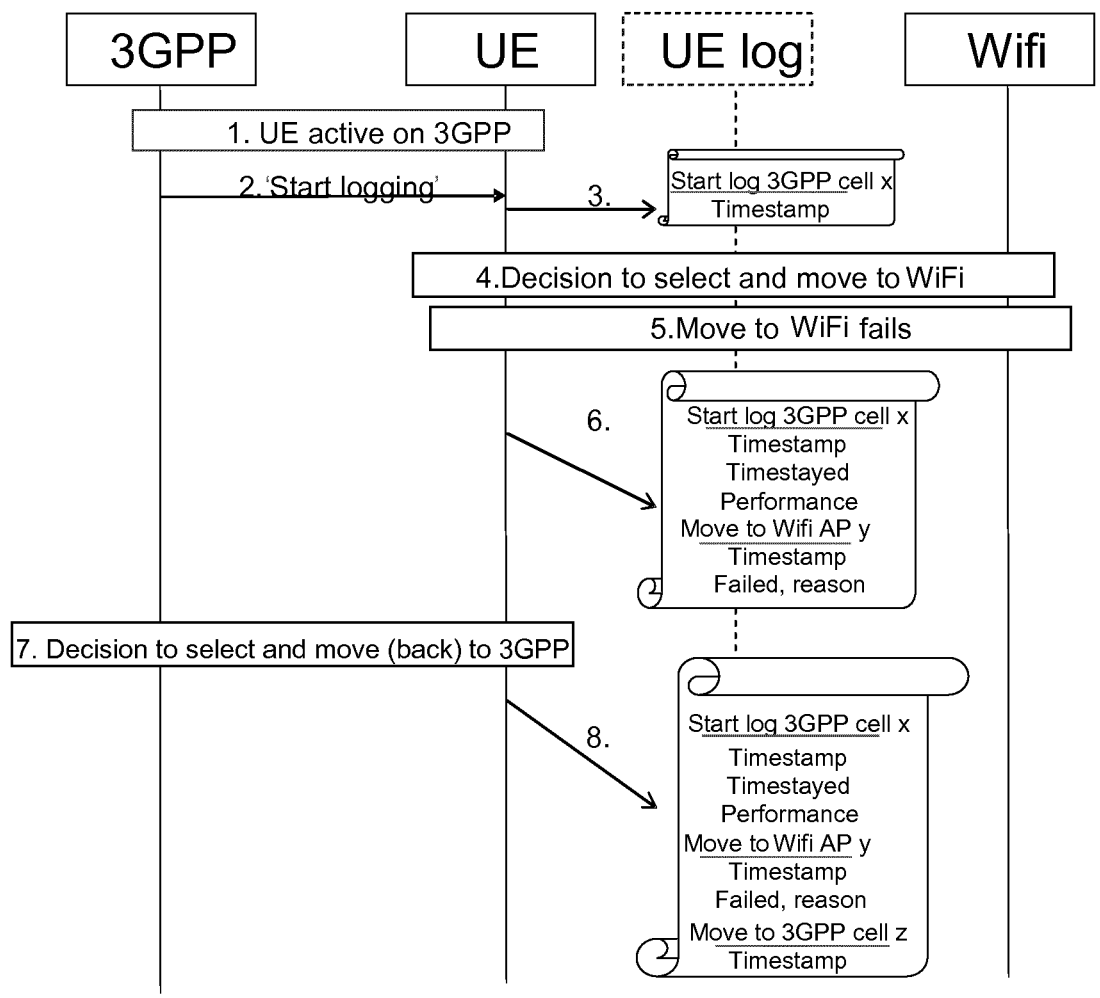
FIG. 3 is a flow diagram illustrating an alternative example of the procedure performed by user equipment (UE) in accordance with the methods described herein.

FIG. 3 illustrates a signalling flow diagram of an alternative implementation of the methods described herein where an association between a UE and a WiFi AP is denied. The steps performed are as follows:

1. A UE is active in a cell of a 3GPP network.
2. The 3GPP network transmits a message to the UE to cause it to start recording or logging information regarding the session with the 3GPP cell.
3. The UE creates a log identifying the 3GPP cell and also the time stamp of when the log was created.
4. The UE detects a Wi-Fi AP and requests to associate with the WiFi AP.
5. The attempt to associate with the WiFi AP is unsuccessful.
6. The UE includes a new entry in the log including information about the unsuccessful request to associate with the WiFi AP. The information may include, for example, an identifier for the WiFi, an identifier for the WiFi AP, the timestamp of the attempted association with the WiFi AP, an identifier indicating that the event is a request to associate with a WiFi AP and a reason that the request failed if known. The UE may also enter into the log performance information relating to the 3GPP cell it was attached to.

7. As a result of the failure the UE may also determine to reattach to a 3GPP network and request to connect to a second 3GPP cell.

8. If the attachment to the 3GPP cell is allowed then the UE will include a new record in the log. The details may include, for example, the timestamp of when the request was made, an identifier indicating that the event is a request to attach with a 3GPP cell. If the request is successful and the UE becomes attached to the 3GPP cell then the log may also be amended to include a time when the UE was no longer attached to the 3GPP cell and a timestamp and identifier for the 3GPP cell that it has become attached to.

Optionally, the UE may also include an entry in the log when the UE transmits a request to associate with a WiFi AP. The log entry may include, for example, the timestamp of when the association was made, an identifier indicating that the event is association with a WiFi AP and the identity of the WiFi AP.

The step of associating with the WiFi AP discussed with reference to FIGS. 2 and 3 may comprise the steps of the UE requesting association with the WiFi AP, the UE receiving an association response from the WiFi AP, the UE requesting authentication and the UE receiving an authentication response. Preferably, the UE includes entries into the logs when it transmits a request to associate with a WiFi AP, if an association response from the WiFi is not received within a predetermined time period or is a rejection message, if an authentication response is not received from the WiFi is not received within a predetermined time period or is a rejection message; however the skilled person will understand that the UE may enter information into the log when any message is transmitted or received by the UE.

Although the present invention has been described with reference to collecting information when attempting to leave a 3GPP cell and attach to a WiFi AP the method is equally applicable to collecting information when attempting to dissociate from a WiFi AP and attach to a 3GPP cell. Additionally, a log entry may also be included when a UE moves between two AP in a single WiFi network or attempts to associate with another WiFi AP and is unsuccessful.

The requests for load information and responses including load information may be transmitted using any suitable protocol.

The UE may begin logging information in response to a message from a WiFi network or any other suitable network. The UE preferably creates a log in response to a message received from a network. For example, the log may be created in response to a Radio Resource Control (RRC) message from a 3GPP radio node such as a Radio Network Controller (RNC) or eNodeB. Alternatively, the creation of the log may be in response from a message received from or initiated by a WLAN AP or WLAN AC. The log may also be controlled by higher layers or by an application located in a 3GPP network or WLAN. The application could, for example, be related to the Operation Support System (OSS) or the Network Management System (NMS). If an application located within or outside a network is used to control the log then the protocol used by the application would form part of the user payload and thus be transparent to 3GPP network nodes and WLAN nodes.

The information stored in the log may be any suitable information. For example, instead of or in addition to including a time stamp of the time a UE detaches from a 3GPP cell or WLAN AP the log may also include a duration specifying the duration of time that the UE was attached to the 3GPP cell or WLAN AP.

Performance information stored in the log may include one or more of Layer 2 throughput, packet delay or packet latency experienced by the UE. The performance logged can be used to evaluate the performance of the different 3GPP cells and APs and understand how the UE experience changed when it moved between the different radio accesses. This is particularly important when the UE is actively steered by the system to select one radio access before another radio access.

Figure 4:
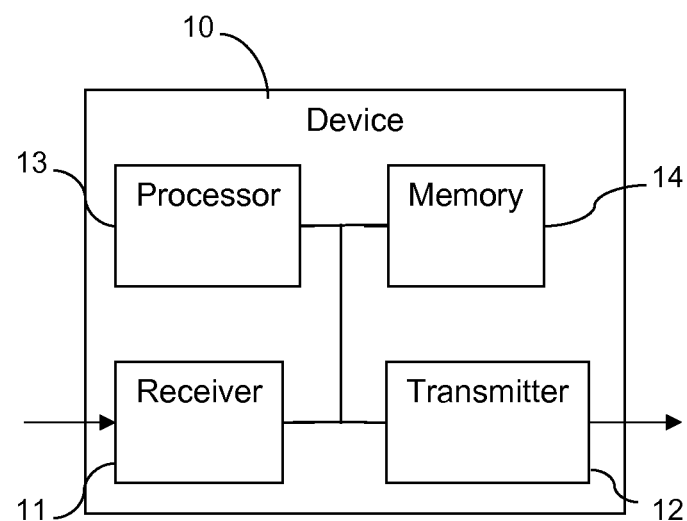
FIG. 4 illustrates schematically an embodiment of a device configured to implement the methods described herein.

FIG. 4 illustrates schematically an embodiment of an entity of a WLAN 10 configured to implement the methods described below. The WLAN entity 10 can be implemented as a combination of computer hardware and software and comprises a receiver 11, a transmitter 12, a processor 13, and a memory 14. The memory 14 stores the various programs/executable files that are implemented by the processor 13, and also provides a storage unit for any required data. For example, the memory 14 can store a copy of a log received from a UE. The programs/executable files stored in the memory 14, and implemented by the processor 13, include but are not limited to requesting information relating to a log from a UE. The WLAN network may, optionally, be connected to the core network illustrated in FIG. 1.

Figure 5:
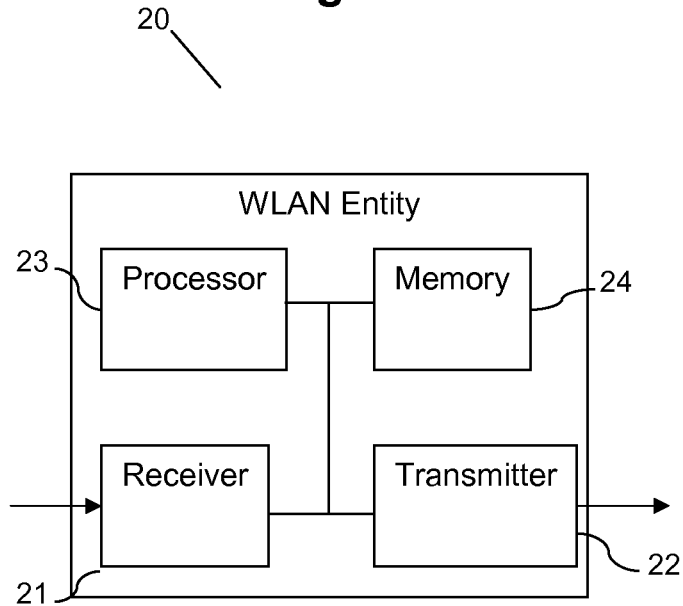
FIG. 5 illustrates schematically an embodiment of a WLAN entity configured to implement the methods described herein.
Figure 6:
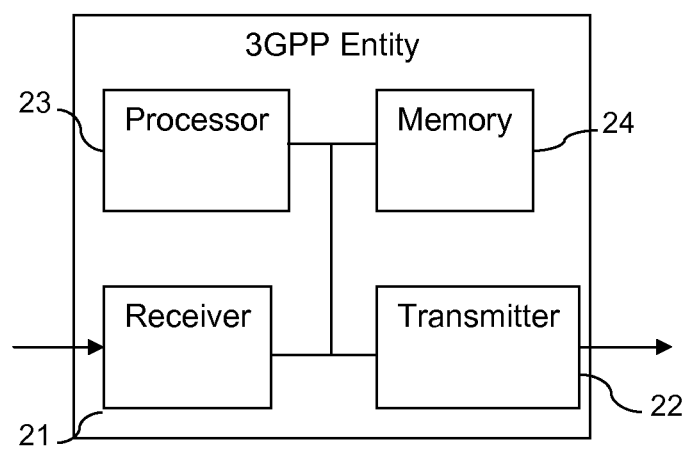
FIG. 6 illustrates schematically an embodiment of a 3GPP entity configured to implement the methods described herein.

FIG. 5 illustrates schematically an embodiment of a device 20 configured to implement the methods described below. The device 20 can be implemented as a combination of computer hardware and software and comprises a receiver 21, a transmitter 22, a processor 23, and a memory 24. The memory 24 stores the various programs/executable files that are implemented by the processor 23, and also provides a storage unit for any required data. For example, the memory 24 can store the log. The programs/executable files stored in the memory 24, and implemented by the processor 23, include but are not limited to determining when to create an entry in a log and transmitting all or part of the log to an entity in a WLAN or in a 3GPP network. The device may be, for example, user equipment (UE), a mobile telephone, a tablet computing device or a laptop.

Although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. For example, in the example flow diagrams described above, only those messages that are of particular relevance are discussed. Those skilled in the art will be aware of those messages that have not been included in this illustration. In addition, whilst the above described embodiments specifically relate to heterogeneous networks comprised of at least a 3GPP network and a WLAN, the principles of the methods described herein are equally applicable to heterogeneous networks that comprise other radio access technologies; such as cdmaOne and CDMA2000.

The invention claimed is:

1. A device operable to attach to a first node and a second node, the device comprising:
   a memory including a log, the log configured to receive at least one entry comprising an identifier for the first node and a timestamp indicating the time that the device attached to the first node; and
   a processor operable to cause an entry to be added to the log to indicate whether an attempt by the device to attach to a second node has been successful;
   wherein one of the first node and the second node operates within a WLAN and the other of the first node and the second node operates within a $3^{rd}$ Generation Partnership Project, 3GPP, network,
   wherein if the device successfully attaches to the second node the processor is operable to cause the log to be updated to include the duration the device was attached to the first node and performance information relating to at least a part of the WLAN or 3GPP network the first node operates in, and to provide the node operating within the WLAN with a copy of all or part of the log.

2. The device as claimed in claim 1, wherein if the device is unsuccessful attaching to the second node the processor is operable to cause the log to be updated to indicate the failure and the reason that the attachment to the second node failed.

3. The device as claimed in claim 1, wherein the processor is operable to cause the log to be updated to include performance information relating to at least part of the WLAN or 3GPP network the first node operates in whilst the device is attached to the first node or the second node.

4. The device as claimed in claim 1, wherein the processor is operable to cause an entry in the log in when the device attempts to connect to the second node.

5. The device as claimed in claim 1, wherein if the device successfully attached to the second node the processor is further operable to provide the node operating within the 3GPP network with a copy of all or part of the log.

6. A method of operating a device operable to attach to a first node and a second node, one of the first node and the second node operates within a WLAN and the other of the first node and the second node operates within or a $3^{rd}$ Generation Partnership Project, 3GPP, network, the device comprising a memory including a log, the log configured to receive at least one entry comprising an identifier for the first node and a timestamp indicating the time that the device attached to the first node; the method comprising:
   causing an entry in the log when an attempt by the device to attach to a second node has been successful or unsuccessful;
   if the device successfully attaches to the second node causing an entry in the log of information relating to the duration the device was attached to the first node and performance information relating to at least a part of the WLAN or 3GPP network the first node operates in; and
   providing the node operating within the WLAN with a copy of all or part of the log.

7. The method of operating a device as claimed in claim 6, wherein if the device is unsuccessful attaching to the second node causing an entry in the log causing the log to include information relating to the failure and the reason that the attachment to the second node failed.

8. The method of operating a device as claimed in claim 6, comprising causing an entry of performance information in the log, the performance information relating to at least part of the WLAN or 3GPP network the first node operates in whilst the device is attached to the first node.

9. The method of operating a device as claimed in claim 6, further comprising:
   providing the node operating within the 3GPP network with a copy of all or part of the log.

* * * * *